Sept. 8, 1925.
J. P. OESCHGER
1,552,727
OSCILLATORY DRIVE FOR LATHE HEADS
Filed Jan. 14, 1924
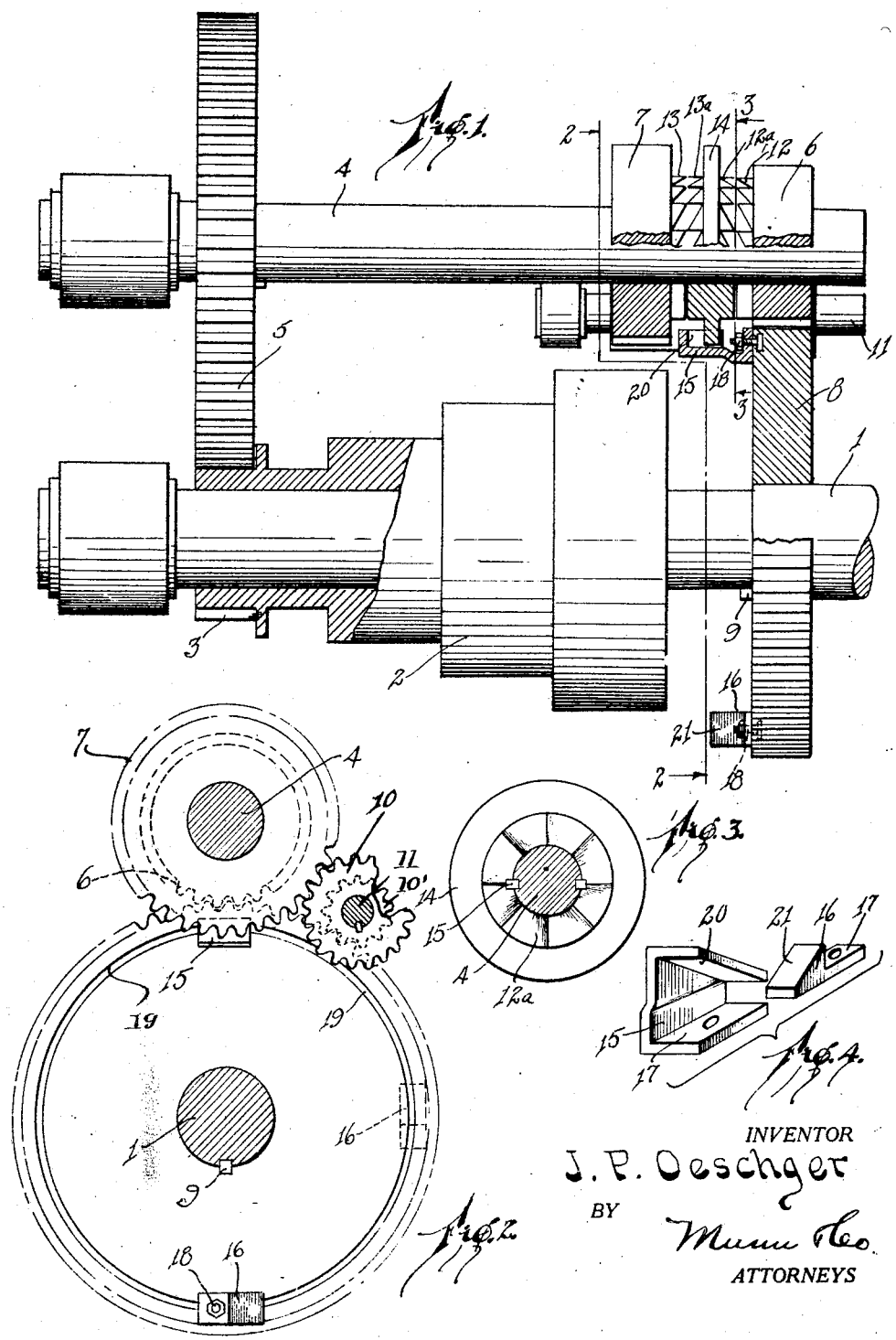
INVENTOR
J. P. Oeschger
BY
ATTORNEYS Patented Sept. 8, 1925.

1,552,727

UNITED STATES PATENT OFFICE.

JOSEPH PAUL OESCHGER, OF CHICAGO, ILLINOIS.

OSCILLATORY DRIVE FOR LATHE HEADS.

Application filed January 14, 1924. Serial No. 686,104.

*To all whom it may concern:*

Be it known that I, JOSEPH PAUL OESCHGER, a citizen of the United States, and a resident of Chicago, in the county of Cook and State of Illinois, have invented a new and useful Improvement in Oscillatory Drives for Lathe Heads, of which the following is a full, clear, and exact description.

My invention relates to improvements in oscillatory drive for lathe heads, and it consists in the combinations, constructions, and arrangements herein described and claimed.

An object of my invention is to provide a device of the type described which when used in conjunction with the ordinary type of lathe spindle and lathe attachments may be used to cut arcuate surfaces less than 360°. My improved oscillatory drive for lathe head may be used for the purpose of cutting arcuate bores and apertures as well as surfaces.

A further object of my invention is to provide a device of the type described which may be employed as an attachment to the ordinary type of lathe and may be attached to the lathe without reconstructing any part of the lathe.

A further object of my invention is to provide a device of the type described which is automatic in operation.

A further object of my invention is to provide a device of the type described which is simple in construction, durable, and thoroughly practical commercially.

Other objects and advantages will appear in the following specification, and the novel features of the invention will be particularly pointed out in the appended claims.

My invention is illustrated in the accompanying drawings forming part of this application, in which Figure 1 is a top plan view partially in section of an embodiment of my invention, Figure 2 is a sectional view along the line 2—2 of Figure 1, Figure 3 is a sectional view along line 3—3 of Figure 1, and Figure 4 is an enlarged perspective view of the stop members forming a part of the mechanism shown in Figure 1.

In carrying out my invention I make use of the ordinary type of lathe spindle 1 having a drive cone 2 rotatably mounted thereupon. The drive cone 2 has a gear portion 3 at its outermost end. A back gear shaft 4 is rotatably mounted in parallel relation to the spindle 1 and has a relatively large gear 5 keyed thereupon which is in mesh with the gear portion 3 of the drive cone 2.

A pair of gears 6 and 7 are rotatably mounted upon the back gear shaft 4 at a predetermined distance from one another.

The gear 7 is larger in diameter than the gear 6. The gear 6 is at all times in mesh with a relatively large gear 8, keyed at 9 to the spindle 1.

An idler gear 10 of less diameter than the gears 6 and 7 is rotatably mounted by means of a shaft 11 in mesh with the gear 7. A second idler gear 10' arranged to turn with the gear 10 is also mounted upon the shaft 11 and is in mesh with the gear 8. The gear 10' is, of course, smaller than the gear 10. The gears 10 and 10' are the only means for driving the gear 8 and consequently the spindle 1, from movement of the gear 7, as when the gear 7 is caused to turn with the back gear shaft 4.

The gears 6 and 7 are each provided with outwardly extending clutch teeth 12 and 13 respectively on the adjacent sides of gears 6 and 7.

A collar 14 is feathered upon the shaft 4 by means of sliding keys 15, (see Figure 3) between the adjacent teeth 12 and 13.

Each side or lateral face of the collar 14 is provided with outwardly extending clutch teeth 12$^a$ and 13$^a$ respectively, which are arranged to mesh or engage with the teeth 12 and 13 of the gears 6 and 7, respectively, depending upon the lateral movement of the collar 14.

Means for automatically moving the collar 14 toward the gear 6 and toward the gear 7 so that rotation of the spindle 1 may be reversed at determined intervals and when the spindle has rotated a part of the complete revolution, is provided in a pair of dogs 15 and 16, (see Figure 4).

The dogs 15 and 16 have base plates 17 forming a part thereof through which bolts 18 are projected. The lower end of the bolts 18 are arranged to lie in a groove 19, enlarged at its innermost end, and disposed concentric with the peripheral wall of the gear 8.

As shown in Figure 2, the dogs 15 and 16 are disposed upon the gear 8 in such a manner as to limit the oscillation of the spindle 1 to 180°. Obviously if the dog 16 is moved to the position shown in dotted lines in Figure 2, the oscillatory movement of the spindle 1 will be confined to 90° since the dogs 15 and 16 would then be substantially 90° apart on the side wall of the gear 8.

The dog 15 is provided with an inclined plate 20 for engaging with the remote side of the collar 14 so as to draw the collar toward the gear 6 while the dog 16 has an inclined surface 21 for the purpose of pushing the collar 14 out of engagement with the gear 6 and into engagement with the gear 7.

From the foregoing description of the various parts of the device the operation thereof may be readily understood. Let us assume that it is desired to cut an arcuate aperture in the wall of a piece of stock held by means of a suitable chuck disposed upon the spindle 1.

Let us further assume that the degree of the arc should be limited to 180° or a substantial semi-circular cut. To this end the dogs 15 and 16 will be secured by means of their bolts 17 and 18 in the position shown in Figure 2.

The belt for driving the lathe will then be placed upon the proper step of the cone drive 2, and the power applied.

As the drive cone 2 turns, the back gear shaft 4 will rotate in an opposite direction. The collar 14 must at this time lie in engagement with the gear 6 or the gear 7. Let us assume that it is in engagement with the gear 6. Rotation of the back gear 4 will of course drive the collar 14, which in turn will drive the gear 6 and the gear 8, which is in mesh therewith, so that the spindle 1 will rotate in precisely the same direction as the drive cone 2.

When the gear 8 is rotated 180°, the dog 16 will engage with the collar 14, forcing the collar out of engagement with the gear 6 and into engagement with the gear 7. The spindle drive 1 will now lie in the following gear train,—the gear 7, the idler gears 10 and 10', and the gear 8. Obviously the direction of rotation of the gear 8 will be in a direction opposite the direction of rotation of the drive cone 2, whereby the stock in the chuck will move 180° in a reverse direction. At this time the dog 15 will engage with the collar 14 and move the collar into engagement with the gear 6. The oscillatory cycle at this point is complete, and further operation of the device is identical to the movements heretofore described.

I claim:

1. The combination with a lathe having a spindle and means for driving said spindle, of a back gear shaft disposed in parallel relation with said spindle and connected with said driving means, a gear carried by said spindle, a gear rotatably mounted on said back gear shaft and in mesh with said spindle, a second gear rotatably mounted on said back gear shaft, an idler gear for connecting said second named gear on said back gear shaft with said gear on said spindle, a collar feathered upon said back gear shaft having clutch teeth on each side thereof, complementary clutch teeth disposed on the adjacent sides of the gears rotatably mounted on said back gear shaft, and means carried by said gear on said spindle for moving said collar laterally on said back gear shaft whereby said collar may engage with one or the other of the gears rotatably mounted on said back gear shaft.

2. The combination with a lathe having a spindle and means for driving said spindle, of a back gear shaft disposed in parallel relation with said spindle and connected with said driving means, a gear carried by said spindle, a gear rotatably mounted on said back gear shaft and in mesh with said spindle, a second gear rotatably mounted on said back gear shaft, an idler gear for connecting said second named gear on said back gear shaft with said gear on said spindle, a collar feathered upon said back gear shaft, having clutch teeth on each side thereof, complementary clutch teeth disposed on the adjacent sides of the gears rotatably mounted on said back gear shaft, and adjustable means carried by said gear on said spindle for moving said collar laterally on said back gear shaft whereby said collar may engage with one or the other of the gears rotatably mounted on said back gear shaft.

JOSEPH PAUL OESCHGER.